O. A. SMITH.
TOOL CARRIER FOR SCREW MACHINES.
APPLICATION FILED JULY 13, 1909.
1,033,835.
Patented July 30, 1912.
2 SHEETS—SHEET 2.
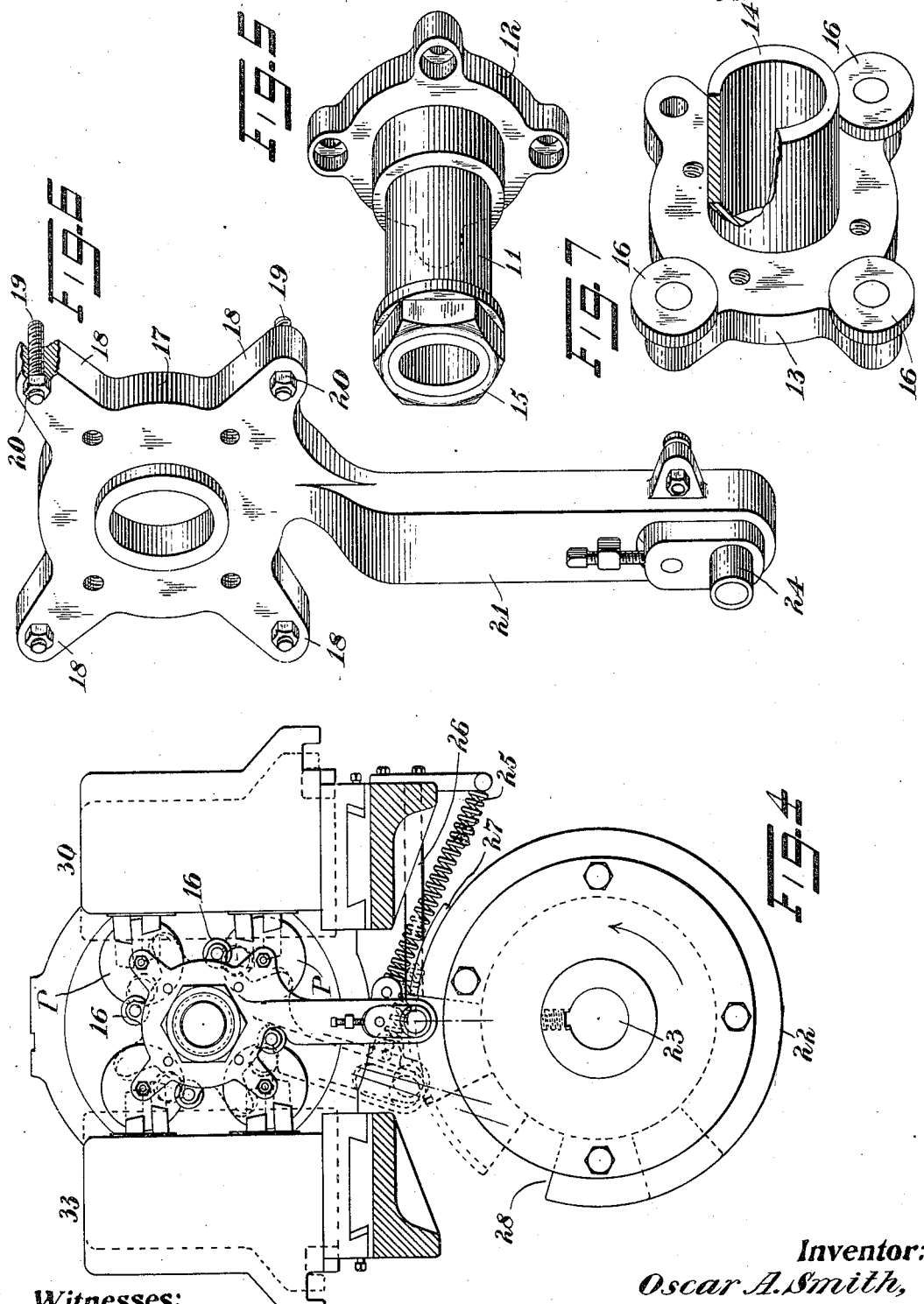
Witnesses:
Inventor:
Oscar A. Smith,
By his Attorney,

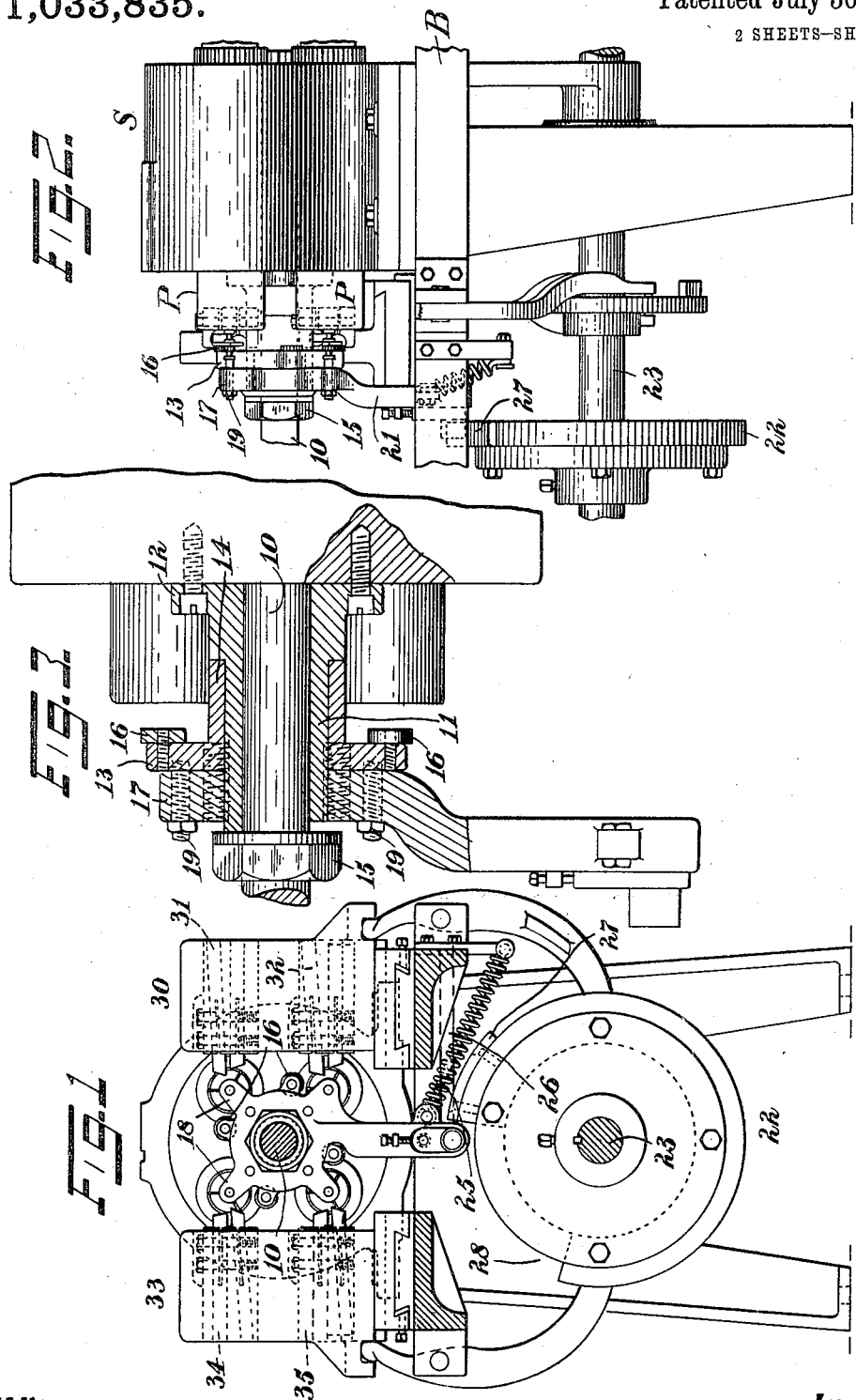

UNITED STATES PATENT OFFICE.

OSCAR A. SMITH, OF CLEVELAND, OHIO, ASSIGNOR TO THE NATIONAL-ACME MANUFACTURING COMPANY, OF CLEVELAND, OHIO, A CORPORATION OF OHIO.

TOOL-CARRIER FOR SCREW-MACHINES.

1,033,835.  Specification of Letters Patent.  Patented July 30, 1912.

Application filed July 13, 1909. Serial No. 507,330.

*To all whom it may concern:*

Be it known that I, OSCAR A. SMITH, a citizen of the United States, residing in Cleveland, in the county of Cuyahoga and State of Ohio, have invented certain new and useful Improvements in Tool-Carriers for Screw-Machines, of which the following is a specification.

This invention relates to automatic multiple spindle machines of the type that act on a series of stock pieces, and has for its object to provide an improved form of tool carrier having a plurality of sets of tools or devices for engaging with the several stock pieces respectively in the different positions of the carrier; and in which machine the carrier is oscillated instead of the stock turret being rotated as is usually the case.

In the accompanying drawings representing one embodiment of my invention Figure 1 is an end elevation of the stock turret end of a screw-machine. Fig. 2 is a side elevation of the parts shown in Fig. 1. Fig. 3 shows enlarged the oscillating carrier in position. Fig. 4 is a partial view similar to that shown in Fig. 1. Fig. 5 shows the sleeve on which the carrier oscillates; and Figs. 6 and 7 show the two principal parts of the carrier.

The machine is shown in Figs. 1 and 2 as having the stock turret S mounted stationary on the bed B, that is shown provided with a series of stock spindles P four being shown. By mechanism not shown, but customary with these machines, the stock is periodically advanced in these spindles automatically at the proper time. The stock spindles in which the stock is gripped by well known means, are usually rotated from a central shaft 10 by suitable gearing.

Heretofore, in this class of machines it has been customary to intermittently rotate the stock turret by steps, equal to the angular distance apart of the stock spindles, whereby the stock pieces are successively brought to engage with a similar number of similarly arranged tools opposite the end of the stock in the machine. In the present machine all of this mechanism is dispensed with and the stock turret is stationary and each stock piece remains in the same axial position. But on the other hand, instead of having a rotary tool turret to engage successively with these stock pieces, an oscillating carrier is provided that has sets of tools or devices arranged in circular series corresponding to the positions of the stock pieces in the stock spindles, and means are provided for automatically oscillating this carrier to bring the sets of work engaging members into position to engage the respective stock pieces successively in the proper stage in the operation of the device.

In the construction illustrated, the shaft 10 has mounted thereon a sleeve 11 having a head 12 that is bolted to the stock turret, as indicated in Fig. 3; the sleeve having a loose fit on the shaft permitting its free rotation. An oscillating tool carrier comprises two members, one member formed of a head 13 secured to a sleeve 14, that rotates on the said sleeve 11, and is held thereon by a nut 15. The head 13 carries a series of knurls 16 equal in number to the stock spindles and correspondingly arranged whereby upon swinging the head on the shaft 10, each of the knurls 16 will be brought to bear on the pieces of stock respectively in the stock spindles.

A head 17 is bolted or otherwise secured to the head 13, and is provided with four radial arms 18 each carrying a suitable stop member such as a bolt 19, that may have a lock nut 20 to secure it in adjusted position. These arms and bolts are out of alinement with the set of knurls 16, as indicated ir Figs. 1 and 4, and each bolt in one position of the tool carrier, is in alinement with a stock piece in one of the stock spindles. By swinging the two heads carrying the knurls and stop bolts, either set of members can be brought to position of engagement with the respective stock pieces; and on swinging the member to a third position, the stop pieces are free or out of alinement with any part of the carrier that will permit the advancement of drills, taps or any other devices from a tool turret, not shown, that is usually placed in a position opposite the stock turret. To swing the tool carrier it is shown as provided with an arm 21, that is engaged by a suitable cam on the main driving shaft 23. A cam 22 is shown on the shaft 23, and a roller 24 is provided on the arm 21, that is pressed toward or in contact with the cam member by a coil spring 25 secured between the arm and the frame of the machine. If desired, a stop bar 26 is provided to limit the swing of the arm by the spring. The cam 22 has a block 27 on its surface that serves to give additional swing to the arm beyond that of the main part of the cam, while a depression 28 in the cam gives another position to the arm. When the roller lies in this depression of the cam the stop pins are in alinement with the stock spindles, and serve to limit the feed of the stock through their spindles. When the further rotation of the cam on the shaft causes engagement of the block 27, the arm will swing the tool carrier the maximum distance, and the knurls are brought into engagement with the stock for the short portion of the cycle during which this short cam block engages the arm. As soon as the block disengages the roller, the arm is drawn back a short distance by the spring until the roller rests on the main portion of the cam. During this larger portion of the cycle, which is a neutral position, the stock can be engaged by various tools from the tool turret, not shown, and can also be engaged by various cross feed tools.

In the machine is shown a cross-feed carrier 30 on one side that may be provided at its upper portion with tools indicated by 31, and at its lower portion by tools indicated by 32, that engage the upper and lower stock pieces respectively on this side of the machine, upon the advancement of the tool carrier during the neutral position of the oscillating carrier. Similarly, on the opposite side is shown a cross-feed carrier 33 provided with tool members at 34 and 35, that engage the other two stock pieces respectively on this side of the machine. This cross-feed holder is advanced at the same time as the other one, and at such time the oscillating carrier is in its neutral position. These cross-feed carriers may also have the usual cutting off tools, that act at the end of the cycle of operation. The cam is shown as arranged to first shift the oscillating carrier to bring the stop devices opposite the stock spindles, at which stage the stock can be advanced in the spindles. Thereupon the cam portion shifts the oscillating carrier to bring the nurling wheels into engagement with the stock, which preferably is the first operation on the stock at this cycle of rotation of the main shaft although certain operations may have been previously performed on the stock. Thereupon the oscillating carrier is shifted to a neutral position, permitting operation of these two cross-feed carriers, and also permitting operation if desired by endwise feeding tools from a tool turret located opposite the stock turret.

From the foregoing it will be observed that each set of stock or work engaging devices in the present instance comprises a stop and a rolling tool such as a nurling tool out of alinement with each other, however, and one in the rear of the other, whereby, on the oscillation of the tool carrier by its spring in one direction, or as shown herein to the left, the four stops will simultaneously and automatically limit the feeding movement of the four pieces of stock carried by the stock spindle owing to the fact that they are in position to engage the ends of the stock, and on the oscillation of the tool carrier in the opposite direction, or to the right, by the cam provided for that purpose the stops are carried away from or to the right of the stock or work and the nurling tools simultaneously brought into engagement with the sides of the work or stock to perform their proper work. Subsequent to this the tool carrier is oscillated by the spring provided for this purpose a short distance again to the left and into its neutral position, and in this position the nurling tool and the stop are at opposite sides of the stock, or one at the right and the other at the left thereof, whereupon the drill may enter between these tools to engage the work, so that the stock may be operated upon by either end or cross fed tools, or both, as occasion may require, and all of these operations are performed in sequence and automatically, and at great speed.

Having thus described my invention, I claim:

1. In a machine of the class described, the combination of a head carrying a work spindle, a side fed tool supported to cut on the center, and an oscillatory tool carrier supported in front of such head and independently of such side fed tool and carrying a plurality of work engaging devices, one operative at the end of the work and the other at the side thereof in sequence and comprising a rolling tool, and means for automatically oscillating said tool carrier first to bring one of such devices into position to engage the work and then the other thereof and then to carry the tool carrier into a neutral position to permit the work to be engaged by end tools.

2. In a machine of the class described, the combination of a head carrying a work spindle, a side fed tool supported to cut on the center, and an oscillatory tool carrier supported in front of such head and independently of such side fed tool and carrying a plurality of work engaging devices, one operative at the end of the work and comprising a stop and the other at the side thereof in sequence and comprising a rolling tool, and means for automatically operating said tool carrier first to bring the stop into position to engage the end of the work and then the rolling tool into position to engage the side of the work and then to carry the tool carrier into a neutral position to permit the work to be engaged by end tools.

3. In a machine of the class described, the combination of a head carrying a work spindle, a side fed tool supported to cut on the center, and an oscillatory tool carrier supported in front of such head and independently of such side fed tool and carrying a plurality of work engaging devices, one operative at the end of the work and comprising a stop and the other at the side thereof and comprising a knurl, and means for automatically operating said tool carrier in one direction to bring the stop into position to engage the end of the work and then in the opposite direction to bring the knurl into position to engage the side of the work and then to oscillate said tool carrier into a neutral position with one device at each side of the work to permit the work to be engaged by end tools.

4. In a multiple spindle machine, the combination of a stationary head carrying four work spindles, a side fed tool supported to cut on the center, and an oscillatory tool carrier supported in front of such head and independently of such side fed tool and carrying four sets of work engaging devices, each set comprising a work stop operative at the end of the work and the other a knurl operative at the side of the work, and means for automatically oscillating said tool carrier first to bring the stop of each set into position to engage the work and then the knurl of the same set into position to engage the same piece of work at the side thereof and then to oscillate said tool carrier in a reverse direction and into a neutral position to permit the work to be engaged by end tools.

5. In a multiple spindle machine, the combination of a shaft, a stationary head into which said shaft projects, a plurality of rotary work spindles carried by said head, means carried by the shaft for rotating said work spindles, an oscillatory tool carrier into which said shaft projects and carrying a plurality of sets of work engaging devices corresponding in number with the number of work spindles, one of said devices located to operate at the end of the work and the other at the side thereof, and means for oscillating said tool carrier in one direction to bring the end operating device into position to engage the work and then in the opposite direction to bring the side operating tool into position to engage the work and then to oscillate the tool carrier in the reverse direction to carry it into a neutral position with one device at each side of the work to permit the work to be engaged by end tools.

6. In a multiple spindle machine, the combination of a shaft, a stationary head into which said shaft projects, rotary spindles carried by such head, means for rotating such spindles from the shaft, an oscillatory tool carrier into which the shaft projects and carrying a plurality of sets of work engaging devices corresponding in number with the number of work spindles, each set comprising a plurality of devices one located out of alinement with the other and in the rear of such other whereby the devices of each set are positioned to operate at different points upon the same piece of work at different times, and means for automatically oscillating said tool carrier first to bring one of such devices of each set into position to engage a piece of work and then the other thereof and then operative to carry such tool carrier into a neutral position to permit the work to be engaged by end tools whereby the work of the several spindles will be simultaneously acted upon by the same devices of each set.

7. In a multiple spindle machine, the combination of a shaft, a stationary head into which said shaft projects, rotary spindles carried by such head, means for rotating such spindles from the shaft, an oscillatory tool carrier into which the shaft projects and carrying a plurality of sets of work engaging devices corresponding in number with the number of work spindles, each set comprising a plurality of devices one located out of alinement with the other and in the rear of such other whereby the devices of each set are positioned to operate at different points upon the same piece of work at different times, and means for automatically oscillating said tool carrier first to bring one of such devices of each set into position to engage a piece of work and then the other thereof and then operative to carry such tool carrier into a neutral position to permit the work to be engaged by end tools whereby the work of the several spindles will be simultaneously acted upon by the same devices of each set, said tool carrier comprising a head having sets of radially extending arms, each of such arms carrying one of the devices.

8. In a multiple spindle machine, the combination of a shaft, a stationary head into which said shaft projects, rotary spindles carried by such head, means for rotating such spindles from the shaft, a sleeve through which the shaft projects, an oscillatory tool carrier on said sleeve and comprising a head having sets of radially extending arms carrying a plurality of sets of work engaging devices corresponding in number with the number of work spindles, each of said arms carrying one of said devices and each set comprising devices located one out of alinement with the other and in the rear of such other whereby the devices of each set are positioned to operate at different points upon the same piece of work at different times, said head also having an arm coöperating with the means for oscillating it, and means for automatically oscillating said tool carrier first to bring one of such devices of each set into position to engage a piece of work and then the other thereof, whereby the work of the several spindles will be simultaneously acted upon by the same devices of each set, and then operative to carry such carrier into a neutral position to permit the work to be engaged by end tools and comprising a spring, a shaft, and a cam mounted thereon and effective to oscillate said arm a predetermined distance in one direction, the spring oscillating it at different times predetermined distances in the opposite direction.

9. In a multiple spindle machine, the combination of a shaft, a stationary head into which said shaft projects, rotary spindles carried by such head, means for rotating such spindles from the shaft, a sleeve through which the shaft projects, an oscillatory tool carrier on said sleeve and comprising a head having sets of radially extending arms carrying a plurality of sets of work engaging devices corresponding in number with the number of work spindles, each of said arms carrying one of said devices and each set comprising devices located one out of alinement with the other and in the rear of such other whereby the devices of each set are positioned to operate at different points upon the same piece of work at different times, the first work engaging device of each set comprising a stop operative at the end of the work and the other work engaging device of the same set operative at the side of the work, said head also having an arm coöperating with the means for oscillating it, and means for automatically oscillating said tool carrier first to bring one of such devices of each set into position to engage a piece of work and then the other thereof, whereby the work of the several spindles will be simultaneously acted upon by the same devices of each set, and then operative to carry such carrier into a neutral position to permit the work to be engaged by end tools and comprising a spring, a shaft and a cam mounted thereon and effective to oscillate said arm a predetermined distance in one direction, the spring oscillating it at different times predetermined distances in the opposite direction.

10. In a machine of the class described, the combination of a head carrying a plurality of work spindles, a side fed tool supported to cut on the center and an oscillatory tool carrier supported in front of such head and independently of such side fed tool and carrying a plurality of sets of work engaging devices corresponding in number with the number of work spindles, the devices of each set constructed to perform different functions, one a rolling operation on the work, and means for automatically oscillating said tool carrier first to bring one of said devices into position to engage the work and then the other thereof and then to carry such carrier into a neutral position to permit the work to be engaged by end tools.

11. In a machine of the class described, the combination of a head carrying a plurality of work spindles, a side fed tool supported to cut on the center, and an oscillatory tool carrier supported in front of such head and independently of such side fed tool and carrying a plurality of sets of work engaging devices corresponding in number with the number of work spindles, the devices of each set constructed to perform different functions, one a rolling operation on the side of the work and one operative at the end of the work and the other at the side thereof in sequence, and means for automatically operating said tool carrier first to bring one of said devices into position to engage the work and then the other thereof and then to carry such carrier into a neutral position to permit the work to be engaged by end tools.

12. In a multiple spindle machine, the combination of a head member, a plurality of work spindles carried thereby, a side fed tool supported to cut on the center, and a tool carrying member supported in front of said head and independently of such side fed tool and carrying a plurality of sets of work engaging devices corresponding in number with the number of work spindles, the devices of each set constructed to perform different functions on the same piece of work, one a rolling operation on the side of the work, and means for automatically oscillating one of said members so that one device of each set will first engage the work and then the other device of the same set engage the same piece of work and for then oscillating said member into a neutral position to permit the work to be engaged by end tools.

13. In a multiple spindle machine, the combination of a head member, a plurality of work spindles carried thereby, a side fed tool supported to cut on the center, and a tool carrying member supported in front of said head and independently of such side fed tool and carrying a plurality of sets of devices corresponding in number with the number of work spindles, the devices of each set constructed to perform different functions on the same piece of work, one operative at the end of the work and the other a rolling operation at the side thereof in sequence, and means for automatically oscillating one of said members so that one device of each set will first engage the work and then the other device of the same set engage the same piece of work and for then oscillating said member into a neutral position to permit the work to be engaged by end tools.

OSCAR A. SMITH.

Witnesses:
A. W. HENN,
PAUL E. RYAN.